(No Model.)
J. A. ERKSON.
CAR FENDER.
No. 575,058.　　　　　　　　Patented Jan. 12, 1897.
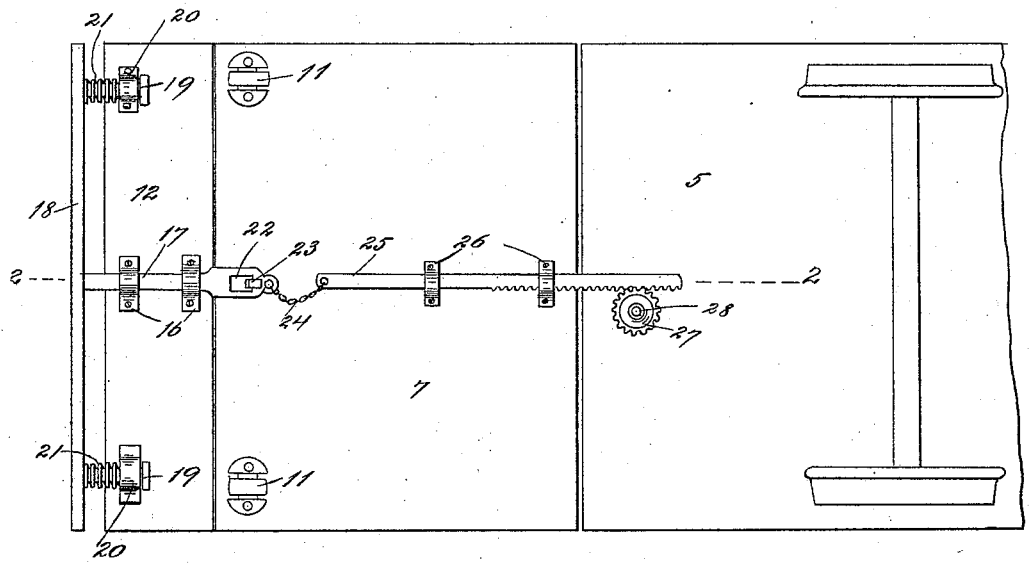
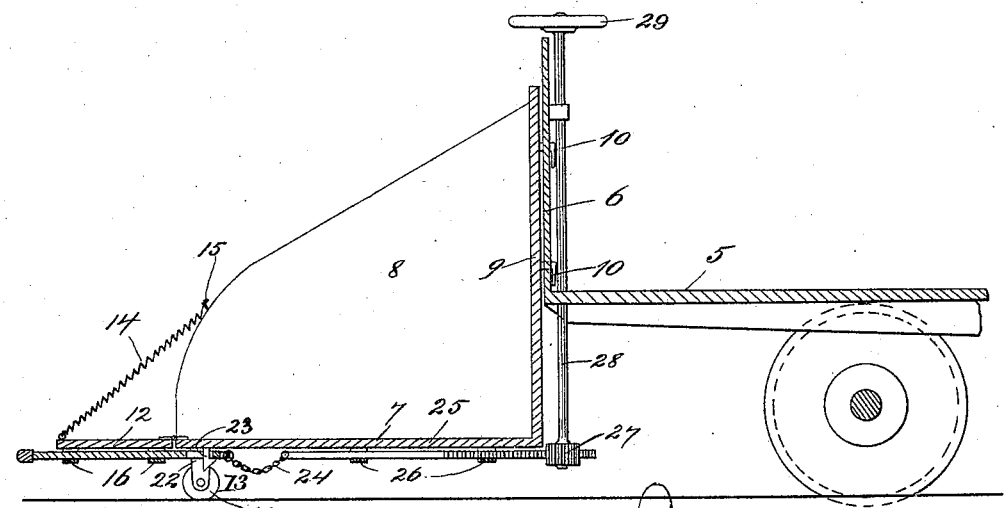

UNITED STATES PATENT OFFICE

JOHN A. ERKSON, OF PRATTSVILLE, NEW YORK.

CAR-FENDER.

SPECIFICATION forming part of Letters Patent No. 575,058, dated January 12, 1897.

Application filed May 14, 1896. Serial No. 591,547. (No model.)

*To all whom it may concern:*

Be it known that I, JOHN A. ERKSON, a citizen of the United States, and a resident of Prattsville, in the county of Greene and State of New York, have invented certain new and useful Improvements in Fenders, of which the following is a specification, reference being had to the accompanying drawings, forming a part thereof, in which similar numerals of reference indicate corresponding parts.

This invention relates to fenders or guards for tramway-cars; and the object thereof is to provide an improved device of this class which is simple in construction and operation and comparatively inexpensive, a further object being to provide a fender or guard for tramway-cars, whereby the serious and sometimes fatal accidents which frequently result from the striking of a person or object by a car when in motion is avoided.

The invention is fully disclosed in the following specification, of which the accompanying drawings form a part, in which—

Figure 1 is a bottom plan view of the platform of a car and my improved fender or guard in position, and Fig. 2 a partial vertical section on the line 2 2.

In the drawings forming part of this specification, the reference-numeral 5 designates the platform of a car, and 6 the dashboard, and in the practice of my invention I provide a fender or guard which consists of a main frame composed of a bottom 7, side plates 8, and a back 9, and the back 9 is provided with hooks 10, which are adapted to be passed through the dashboard of a car, so as to secure the fender or guard thereto, or said fender or guard may be secured to the dashboard and platform in any desired manner.

The forward end of the main frame of the fender or guard is provided at its opposite corners with rollers 11, which are adapted to rest upon the ground, and I also provide a supplemental fender or guard consisting of a plate or board 12, which is hinged to the bottom 7 of the fender or guard frame, as shown at 13, and the front edge of which is provided near each corner with spiral springs 14, which are carried backwardly and connected with the side board 8 at 15, and said plate or board 12 is provided centrally of its under side with two keepers 16, through which passes a sliding bar 17, the outer end of which is secured to a cross-bar 18, which is provided at each end with inwardly-directed rods 19, which pass through keepers 20 and on which are mounted springs 21, which are adapted to force the bar 18 outwardly, and the inner end of the sliding bar 17, which passes through the keepers 16, is provided with an oblong slot or opening 22, and secured to the bottom 7 of the main fender or guard frame is a depending catch 23, the head of which is directed backwardly, as shown at 24, and said catch is adapted to pass through the slot or opening 22 in the bar 17, and connected with the inner end of the bar 17 is a chain or other device 24, which is secured to a sliding rack-bar 25, which is mounted in keepers 26, and the rear end of which is adapted to operate in connection with a pinion 27, which is mounted on a vertical shaft 28, which passes upwardly through the platform of the car and is provided at its upper end with a wheel or handle 29.

The operation will be readily understood from the foregoing description when taken in connection with the accompanying drawings and the following statement thereof: The normal position of the parts is that shown in the drawings, and if a person or object should be struck by a car when in motion the cross-bar 18 would be the first to strike such person or object, and said bar would be driven backwardly against the operation of the springs 21 and thus release the inner end of the sliding bar 17 from the catch 28, and the springs 14 would draw the outer edge of the plate or board 18 upwardly, and said person or object would be thrown onto the bottom 7 of the main fender or guard frame and be held thereon by the plate or board 12.

The supplemental fender or guard may be returned to the position shown in the drawings by simply operating the shaft 28, whereby the rack-bar 25 will be drawn backwardly and the outer edge of the supplemental fender or guard will be drawn down into the position shown in Figs. 1 and 2, and in this operation the catch 23 will pass through the slot or opening 22, and then by releasing the rack-bar 25 or turning the shaft 28 in the opposite direction the springs 21 will force the bar 18 outwardly, and with it the sliding bar 17, and the catch 23 will again operate to hold the parts in the position shown.

This device is simple in construction and operation and perfectly adapted to accomplish the result for which it is intended; and it is evident that changes in and modifications of the construction herein described may be made without departing from the spirit of my invention or sacrificing its advantages.

Instead of returning the supplemental fender or guard to its normal position or that shown in Figs. 1 and 2, by means of the shaft 28 after it has been raised, as above described, said supplemental guard may be returned by hand, as will be readily understood all that is necessary being to take hold of the front edge thereof and depress it into the position shown in the drawings, in which operation the catch 23 will pass through the slot 22, it being understood that in this operation the bar 18 must be pressed backwardly, and after the supplemental guard is thus depressed the bar 18 is released and the springs 21 force it outwardly, and thus the catch 23 is enabled to operate.

Having fully described my invention, I claim as new and desire to secure by Letters Patent—

1. A fender or guard for tramway-cars, consisting of a main fender or guard frame, which is adapted to be connected with the dashboard of the car, and a supplemental fender or guard hinged to the front edge thereof, said supplemental fender or guard being provided with springs which are connected with the main fender or guard frame, and by which the forward edge thereof, is adapted to be drawn upwardly, said supplemental fender or guard frame being also provided with a cross-bar, which is supported in front thereof, and which is adapted to be forced backwardly, said cross-bar being provided centrally thereof, with a sliding bar which projects backwardly beneath the main fender or guard frame, and through the inner end of which passes a catch, said sliding bar being also connected with a sliding rack-bar which is adapted to be operated by a pinion mounted on the lower end of a shaft which extends upwardly through the platform of the car, substantially as shown and described.

2. A fender or guard for tramway-cars consisting of a main fender or guard frame, a supplemental fender or guard hinged to the front edge thereof, and adapted to be drawn upwardly by springs connected therewith, a cross-bar supported in front of said supplemental fender or guard and held in position by springs, said cross-bar being adapted to be forced backwardly and being provided centrally with a sliding bar which passes backwardly beneath the main frame, and by which the supplemental fender or guard is held in a depressed position, and means connected therewith and with the dashboard of the car, for releasing said sliding bar, substantially as shown and described.

3. A fender or guard for tramway-cars consisting of a main fender or guard frame, a supplemental fender or guard hinged to the front edge thereof, and adapted to be drawn upwardly by springs connected therewith, a cross-bar supported in front of said supplemental fender or guard and held in position by springs, said cross-bar being adapted to be forced backwardly and being provided centrally with a sliding bar which passes backwardly beneath the main frame, and by which the supplemental fender or guard is held in a depressed position, and means connected therewith and with the dashboard of the car, for releasing said sliding bar, consisting of a catch which passes through the inner end thereof, and a rack-bar connected with the inner end thereof, and adapted to be operated by a pinion mounted on a shaft which passes upwardly through the platform of the car, and said fender or guard frame being provided with a bottom, and with sides connected therewith, and to which the springs which are designed to draw the supplemental fender-frame upwardly, are secured, substantially as shown and described.

In testimony that I claim the foregoing as my invention I have signed my name, in presence of the subscribing witnesses, this 13th day of May, 1896.

JOHN A. ERKSON.

Witnesses:
C. GERST,
L. M. MULLER.